United States Patent
Xu et al.

(10) Patent No.: US 11,799,792 B2
(45) Date of Patent: Oct. 24, 2023

(54) MPDU TRANSMISSION METHOD AND DEVICE FOR MULTI-LINK SYSTEM, MPDU RECEPTION METHOD AND DEVICE FOR MULTI-LINK SYSTEM, STORAGE MEDIUM, TRANSMITTER AND RECEIVER

(71) Applicant: SPREADTRUM COMMUNICATIONS (SHANGHAI) CO., LTD., Shanghai (CN)

(72) Inventors: Yanchao Xu, Shanghai (CN); Yuhren Jauh, Shanghai (CN); Chinghwa Yu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/958,058

(22) PCT Filed: Mar. 4, 2020

(86) PCT No.: PCT/CN2020/077690
§ 371 (c)(1),
(2) Date: Jun. 25, 2020

(87) PCT Pub. No.: WO2020/233190
PCT Pub. Date: Nov. 26, 2020

(65) Prior Publication Data
US 2022/0247691 A1 Aug. 4, 2022

(30) Foreign Application Priority Data
May 20, 2019 (CN) ............................ 201910419428

(51) Int. Cl.
*H04L 47/34* (2022.01)
*H04L 47/10* (2022.01)

(52) U.S. Cl.
CPC .............. *H04L 47/34* (2013.01); *H04L 47/15* (2013.01)

(58) Field of Classification Search
CPC ................................. H04L 47/34; H04L 47/15
See application file for complete search history.

(56) References Cited

U.S. PATENT DOCUMENTS

| 2008/0165670 A1 | 7/2008 | Tao et al. |
| 2010/0322130 A1 | 12/2010 | Gong et al. |
| 2014/0254349 A1 | 9/2014 | Jia et al. |
| 2018/0205502 A1 | 7/2018 | Merlin et al. |

(Continued)

FOREIGN PATENT DOCUMENTS

| CN | 1883165 A | 12/2006 |
| CN | 101227483 A | 7/2008 |

(Continued)

OTHER PUBLICATIONS

Yanwei et al., "The researches on TCP Congestion Control over Satellite and Skipping Window algorithm", www.autocontrol.com.cn, 3 pages; 2004 (Year: 2004).*

(Continued)

*Primary Examiner* — Siming Liu
(74) *Attorney, Agent, or Firm* — CANTOR COLBURN LLP

(57) ABSTRACT

MPDU transmission method and device for a multi-link system, MPDU reception method and device for a multi-link system, a storage medium, a transmitter and a receiver are provided. The MPDU transmission method includes: determining a frame sequence number space which includes a plurality of frame sequence numbers and is defined based on a triplet <U-ID_t, U-ID_r, TID>, wherein U-ID_t represents a unique identifier of a transmitter, and U-ID_r represents a unique identifier of a receiver; determining a transmission order of a plurality of MPDUs to be transmitted, wherein each of the plurality of MPDUs carries an MSDU; sequen- (Continued)

tially obtaining frame sequence numbers from the frame sequence number space based on the transmission order; and transmitting the plurality of MPDUs based on the transmission order. Disordered reception issues at the receiver in multi-link transmission may be solved.

15 Claims, 6 Drawing Sheets

(56) References Cited

U.S. PATENT DOCUMENTS

| | | | |
|---|---|---|---|
| 2018/0206174 A1* | 7/2018 | Zhou | ............... H04L 5/00 |
| 2018/0206284 A1 | 7/2018 | Zhou et al. | |
| 2019/0097952 A1 | 3/2019 | Yong et al. | |

FOREIGN PATENT DOCUMENTS

| | | | |
|---|---|---|---|
| CN | 101931887 A | 12/2010 | |
| CN | 105191229 A | 12/2015 | |
| WO | 2018136519 A1 | 7/2018 | |

OTHER PUBLICATIONS

International Search Report with Written Opinion of the International Searching Authority for International Application No. PCT/CN2020/077690; dated Jun. 4, 2020; 9 pages.
EPO Extended European Search Report for corresponding EP Application No. 20810042.0; dated Jan. 5, 2023.
CNIPA 1st Office Action for corresponding CN Application No. 2019104194282; dated Sep. 5, 2022.
Intellectual Property INDIA Office Action for corresponding IN Application No. 202117059191; dated Jun. 28, 2022.
Wenhui et al., "The Implementation of X. 75 Multilink Procedures", Journal of Beijing University of Posts and Telecommunications, vol. 18 No. 1, Mar. 1995, 6 pages; with English abstract on last page.
Yanwei et al., "The Researches on TCP Congestion Control over Satellite and Skipping Window algorithm", www.autocontrol.com, 3 pages; with English abstract on p. 1.

* cited by examiner

US 11,799,792 B2

MPDU TRANSMISSION METHOD AND DEVICE FOR MULTI-LINK SYSTEM, MPDU RECEPTION METHOD AND DEVICE FOR MULTI-LINK SYSTEM, STORAGE MEDIUM, TRANSMITTER AND RECEIVER

CROSS-REFERENCE TO RELATED APPLICATIONS

This is the U.S. national stage of application No. PCT/CN2020/077690, filed on Mar. 4, 2020. Priority under 35 U.S.C. § 119(a) and 35 U.S.C. § 365(b) is claimed from Chinese Patent Application No. 201910419428.2, filed on May 20, 2019, and entitled "MPDU TRANSMISSION METHOD AND DEVICE FOR MULTI-LINK SYSTEM, MPDU RECEPTION METHOD AND DEVICE FOR MULTI-LINK SYSTEM, STORAGE MEDIUM, TRANSMITTER AND RECEIVER", the entire disclosure of which is incorporated herein by reference.

TECHNICAL FIELD

The present disclosure generally relates to communication technology field, and more particularly, to MPDU transmission method and device for a multi-link system, MPDU reception method and device for a multi-link system, a storage medium, a transmitter and a receiver.

BACKGROUND

In conventional Wireless Fidelity (Wi-Fi) systems, there is only one Media Access Control (MAC) layer and one Port Physical Layer (PHY) (including Radio Frequency (RF)). For typical WiFi systems that support dual bands (2.4 GHz and 5 GHz), merely one RF is generally enabled to receive data. This is a typical case of a single-link Wireless Local Area Network (WLAN) system. With the advancement of a WLAN standard, features of multi-bands (2.4 GHz, 5 GHz and 60 GHz) or multi-links have been discussed in IEEE 802.11 be (EHT) and RTA TIG. Therefore, in practice, more and more WLAN products (e.g., products that support multi-band concurrent features) will support multi-links.

In existing techniques, each link has its own frame sequence number. When a transmitter transmits on multiple links, frame sequence numbers may be overlapped, and thus a receiver cannot distinguish a real order of received MAC protocol data unit (MPDU), resulting in an incorrect reception procedure of MAC Service Data Units (MSDUs).

SUMMARY

Embodiments of the present disclosure provide MPDU transmission method and device for a multi-link system, MPDU reception method and device for a multi-link system, a storage medium, a transmitter and a receiver, which may avoid disordered reception issues at the receiver in multi-link transmission.

In an embodiment of the present disclosure, an MPDU transmission method for a multi-link system is provided, including: determining a frame sequence number space which includes a plurality of frame sequence numbers and is defined based on a triplet <U-ID_t, U-ID_r, TID>, wherein U-ID_t represents a unique identifier of a transmitter, and U-ID_r represents a unique identifier of a receiver; determining a transmission order of a plurality of MPDUs to be transmitted; sequentially obtaining frame sequence numbers from the frame sequence number space based on the transmission order; and transmitting the plurality of MPDUs based on the transmission order, wherein each of the plurality of MPDUs includes a transmitter address, a receiver address, an MSDU, the corresponding frame sequence number and a Traffic Identifier (TID), so that the receiver determines the transmitter based on the transmitter address, and sorts one or more MPDUs which come from the same transmitter and have the same TID based on the frame sequence number.

Optionally, transmitting the plurality of MPDUs based on the transmission order includes: determining an initial transmission window which includes a first preset number of MPDUs arranged in the transmission order, wherein a first MPDU in the initial transmission window is an initial transmission MPDU; sequentially transmitting MPDUs in the initial transmission window until it is determined that transmission of all the MPDUs in the initial transmission window has completed, wherein the initial transmission MPDU is the first one to be transmitted; when transmission of all the MPDUs in the initial transmission window has completed, triggering update of the initial transmission window, wherein a difference between a sequence number of a first MPDU in the updated transmission window and a sequence number of the initial transmission MPDU is the first preset number; sequentially transmitting MPDUs in the updated transmission window until it is determined that transmission of all the MPDUs in the updated transmission window has completed, wherein the first MPDU in the updated transmission window is the first one to be transmitted; and continuing to update the updated transmission window again, and sequentially transmitting MPDUs in the latest updated transmission window, until it is determined that transmission of the plurality of MPDUs has completed.

Optionally, sequentially transmitting MPDUs in the initial transmission window until it is determined that transmission of the MPDUs in the initial transmission window has completed includes: on each link, once an MPDU is transmitted, if acknowledge information of the MPDU is received from the receiver within a first preset time period, transmitting a next MPDU in the initial transmission window; once an MPDU is transmitted, if acknowledge information of the MPDU is not received from the receiver within the first preset time period, retransmitting the MPDU; if acknowledge information of the retransmitted MPDU is received from the receiver within the first preset time period, transmitting the next MPDU in the initial transmission window; if acknowledge information of the retransmitted MPDU is not received from the receiver within the first preset time period, retransmitting the MPDU until a preset number of retransmissions have been done; and for all the MPDUs in the initial transmission window, if acknowledge information is received from the receiver or the preset number of retransmissions have been done, determining that transmission of all the MPDUs in the initial transmission window has completed.

Optionally, sequentially transmitting MPDUs in the initial transmission window until it is determined that transmission of the MPDUs in the initial transmission window has completed further includes: before transmitting each MPDU, detecting a life time of the MPDU; and when the life time of the MPDU ends, abandoning transmitting the MPDU.

Optionally, the first preset number is predefined.

Optionally, the MPDUs are non-aggregated MPDUs.

Optionally, before the frame sequence number space is determined, the method further includes: when a connection is set up on any link, transmitting U-ID_t to the receiver, and receiving U-ID_r from the receiver.

In an embodiment of the present disclosure, an MPDU reception method for a multi-link system is provided, including: receiving a plurality of MPDUs, wherein each of the plurality of MPDUs includes a transmitter address, a receiver address, an MSDU, a frame sequence number and a TID; determining a transmitter of each MPDU based on the transmitter address; and sorting one or more MPDUs from the same transmitter with the same TID based on the frame sequence numbers of the one or more MPDUs, wherein the frame sequence numbers are sequentially allocated by the transmitter from the frame sequence number space based on a transmission order of the plurality of MPDUs, and the frame sequence number space includes a plurality of frame sequence numbers and is defined based on a triplet <U-ID_t, U-ID_r, TID>, wherein U-ID_t represents a unique identifier of the transmitter, and U-ID_r represents a unique identifier of a receiver.

Optionally, sorting one or more MPDUs from the same transmitter with the same TID based on the frame sequence numbers of the one or more MPDUs includes: determining an initial reception window, where the initial reception window includes a second preset number of MPDUs arranged in the transmission order, and a first MPDU in the initial reception window is an initial reception MPDU; and comparing a sequence number of the received MPDU with sequence numbers of the MPDUs already in the initial reception window, and determining whether to report the received MPDU based on the comparison result.

Optionally, comparing a sequence number of the received MPDU with sequence numbers of the MPDUs already in the initial reception window, and determining whether to report the received MPDU based on the comparison result includes: if the frame sequence number of the received MPDU is the frame sequence number of the initial reception MPDU, reporting the MPDU and triggering update of the initial reception window to obtain a first updated reception window, wherein a first MPDU in the first updated reception window is an MPDU next to the initial reception MPDU; detecting whether an MPDU next to the latest reported MPDU has been received; if the MPDU next to the latest reported MPDU has been received, reporting the MPDU next to the latest reported MPDU; and triggering update of the first updated reception window.

Optionally, the method further includes: if the frame sequence numbers of one or more received MPDUs are frame sequence numbers other than the frame sequence number of the initial reception MPDU in the initial reception window, storing the one or more received MPDUs into a buffer.

Optionally, comparing a sequence number of the received MPDU with sequence numbers of the MPDUs already in the initial reception window, and determining whether to report the received MPDU based on the comparison result includes: if the frame sequence numbers of one or more received MPDUs are smaller than a smallest frame sequence number of the MPDUs in the initial reception window, discarding the one or more received MPDUs.

Optionally, comparing a sequence number of the received MPDU with sequence numbers of the MPDUs already in the initial reception window, and determining whether to report the received MPDU based on the comparison result includes: if the frame sequence number of the received MPDU is greater than a greatest frame sequence number of the MPDUs in the initial reception window, storing the received MPDU into a buffer; updating the initial reception window to obtain a second updated reception window, wherein a frame sequence number of the received MPDU is a greatest frame sequence number of the MPDUs in the second updated reception window; among the received and unreported MPDUs, reporting the MPDUs whose frame sequence numbers are smaller than a smallest frame sequence number of the MPDUs in the second updated reception window; detecting whether a first MPDU in the second updated reception window has been received; if the first MPDU in the second updated reception window has been received, reporting the first MPDU, or else, suspending reporting; detecting whether an MPDU next to the latest reported MPDU has been received; and if the MPDU next to the latest reported MPDU has been received, reporting the MPDU next to the latest reported MPDU, or else, suspending reporting.

Optionally, the method further includes: when the reporting is suspended, triggering update of the second updated reception window, wherein a first MPDU in the updated second updated reception window is an MPDU next to the latest reported MPDU.

Optionally, comparing a sequence number of the received MPDU with sequence numbers of the MPDUs already in the initial reception window, and determining whether to report the received MPDU based on the comparison result includes: setting a timer starting from a time of reporting a previous MPDU, wherein a duration of the timer is a second preset time period; when the timer expires, if the frame sequence numbers of one or more received MPDUs are the frame sequence numbers other than the frame sequence number of the initial reception MPDU in the initial reception window, reporting an MPDU with a smallest frame sequence number in the one or more received MPDUs; detecting whether an MPDU next to the latest reported MPDU has been received; if the MPDU next to the latest reported MPDU has been received, reporting the MPDU next to the latest reported MPDU, or else, suspending reporting; when the reporting is suspended, triggering update of the initial reception window to obtain a third updated reception window, wherein a first MPDU in the third updated reception window is an MPDU next to the latest reported MPDU; and when the reporting is suspended, triggering the timer to restart.

Optionally, comparing a sequence number of the received MPDU with sequence numbers of the MPDUs already in the initial reception window, and determining whether to report the received MPDU based on the comparison result further includes: when the timer expires, if no MPDU has been received, triggering the timer to restart, wherein a duration of the timer is the second preset time period.

In an embodiment of the present disclosure, a MPDU transmission device for a multi-link system is provided, including: a space determining circuitry configured to determine a frame sequence number space which includes a plurality of frame sequence numbers and is defined based on a triplet <U-ID_t, U-ID_r, TID>, wherein U-ID_t represents a unique identifier of a transmitter, and U-ID_r represents a unique identifier of a receiver; an order determining circuitry configured to determine a transmission order of a plurality of MPDUs to be transmitted; a sequence number obtaining circuitry configured to sequentially obtain frame sequence numbers from the frame sequence number space based on the transmission order; and a transmitting circuitry configured to transmit the plurality of MPDUs based on the transmission order, wherein each of the plurality of MPDUs includes a transmitter address, a receiver address, an MSDU, the corresponding frame sequence number and a TID, so that the receiver determines the transmitter based on the transmitter address, and sorts one or more MPDUs which come from the same transmitter and have the same TID based on the frame sequence number.

In an embodiment of the present disclosure, a MPDU reception device for a multi-link system is provided, including: a receiving circuitry configured to receive a plurality of MPDUs, wherein each of the plurality of MPDUs includes a transmitter address, a receiver address, an MSDU, a frame sequence number and a TID; a determining circuitry configured to determine a transmitter of each MPDU based on the transmitter address; and a sorting circuitry configured to sort one or more MPDUs from the same transmitter with the same TID based on the frame sequence numbers of the one or more MPDUs, wherein the frame sequence numbers are sequentially allocated by the transmitter from the frame sequence number space based on a transmission order of the plurality of MPDUs, and the frame sequence number space includes a plurality of frame sequence numbers and is defined based on a triplet <U-ID_t, U-ID_r, TID>, wherein U-ID_t represents a unique identifier of the transmitter, and U-ID_r represents a unique identifier of a receiver.

In an embodiment of the present disclosure, a storage medium having computer instructions stored therein is provided, wherein when the computer instructions are executed, the above MPDU transmission method or the above MPDU reception method is performed.

In an embodiment of the present disclosure, a transmitter including a memory and a processor is provided, wherein the memory has computer instructions stored therein, and when the processor executes the computer instructions, the above MPDU transmission method is performed.

In an embodiment of the present disclosure, a receiver including a memory and a processor is provided, wherein the memory has computer instructions stored therein, and when the processor executes the computer instructions, the above MPDU reception method is performed.

Embodiments of the present disclosure may provide following advantages. In embodiments of the present disclosure, a frame sequence number space is determined which includes a plurality of frame sequence numbers and is defined based on a triplet <U-ID_t, U-ID_r, TID>, wherein U-ID_t represents a unique identifier of a transmitter, and U-ID_r represents a unique identifier of a receiver. A transmission order of a plurality of MPDUs to be transmitted is determined, frame sequence numbers are sequentially obtained from the frame sequence number space based on the transmission order, and the plurality of MPDUs are transmitted based on the transmission order. Each of the plurality of MPDUs includes a transmitter address, a receiver address, an MSDU, the corresponding frame sequence number and a TID, so that the receiver determines the transmitter based on the transmitter address, and sorts one or more MPDUs which come from the same transmitter and have the same TID based on the frame sequence number. With the embodiments of the present disclosure, the frame sequence number space is generated based on the unique identifiers of the transmitter and the receiver, and the frame sequence numbers are sequentially obtained from the frame sequence number space during transmission, which may reduce possibility of overlap. Besides, the transmitted MPDUs include the frame sequence numbers, which helps to avoid disordered reception issues at the receiver in multi-link transmission.

Further, in embodiments of the present disclosure, by setting the initial transmission window and triggering the update of the initial transmission window when the MPDUs in the initial transmission window are all transmitted, groups of MPDUs can be transmitted sequentially, so that a transmission order and a reception order of MPDUs are more in line with a real order of the MPDUs, which further helps to avoid disordered reception issues at the receiver in multi-link transmission.

Further, in embodiments of the present disclosure, by setting the initial reception window and triggering the update of the initial reception window after reporting the MPDU, a case of waiting for some MPDUs for a long time when the received MPDUs are out of order may be avoided, which helps the receiver to report the received MPDUs as soon as possible while still maintaining a real order of these MPDUs.

DETAILED DESCRIPTION

In the existing techniques, a multi-link system architecture has been proposed. MPDUs can be transmitted and received using all allowed links, which is beneficial to reduce latency and dynamically use each link, thereby improving MPDU exchange efficiency.

Figure 1:
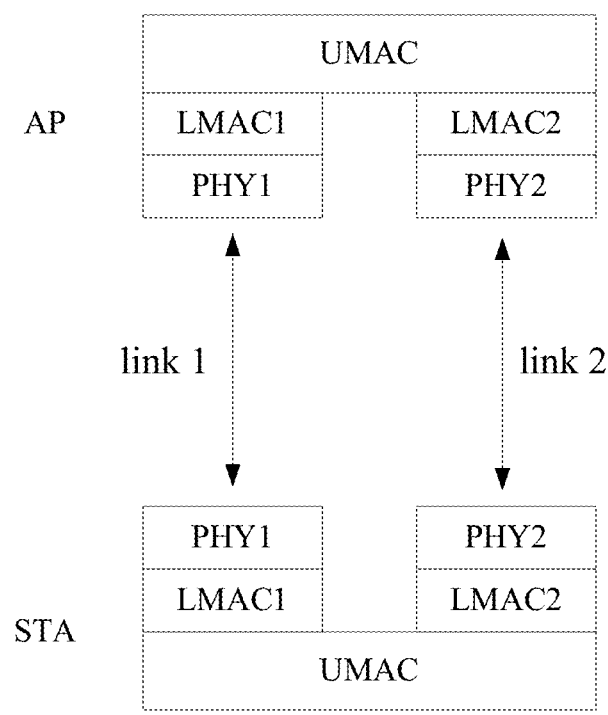
FIG. 1 is a diagram of an architecture of a multi-link system in existing techniques.

Referring to FIG. 1, FIG. 1 is a diagram of an architecture of a multi-link system in existing techniques.

As shown in FIG. 1, as all links allow the transmission of MPDUs, MPDUs belonging to a same type, such as having a same Receiver address (RA) or a same Transmitter address (TA) or a same Traffic Identifier (TID), may be transmitted on multiple links. In traditional IEEE 802.11, some data-related attributes, such as a frame Sequence Number (SN) that can be used to represent an order of MSDUs, are defined based on a triplet of <RA, TA, TID>. These directly affect the MPDU transmission and reception procedure.

Specifically, existing transmission and reception mechanism of non-aggregated MPDUs is based on the IEEE 802.11 standard.

In the traditional IEEE 802.11, a transmission sequence number space of the transmitter is defined based on the triplet of <RA, TA, TID>.

In the traditional IEEE 802.11, there are no special rules for the transmission and reception of non-aggregated MPDUs.

According to the traditional IEEE 802.11, when the transmitter transmits a non-aggregated MPDU on any link, its SN is obtained from the frame sequence number space determined according to <RA, TA, TID>.

According to the traditional IEEE 802.11, when receiving a non-aggregated MPDU on any link, the receiver immediately passes it to an upper layer for processing.

Inventors found through research that in the multi-link system, the existing solutions may have following disadvantages. When the transmitter and/or the receiver uses different MAC addresses for different links, for multiple MPDUs with the same TID and the same receiver, if these MPDUs are transmitted on different links, the frame sequence numbers of these MPDUs will be allocated from different transmission sequence number spaces, as the transmission sequence number space in the existing solutions is based on <RA, TA, TID>. As the SNs of these MPDUs come from mutually independent transmission sequence number spaces, the SNs of these MPDUs cannot reflect a correct order of these MPDUs.

In the existing solutions, after receiving any non-aggregated MPDU, the receiver immediately passes it to the upper layer for processing. With the above operation, the receiver cannot deliver the non-aggregating MPDUs to the upper layer for processing in sequence, causing the non-aggregating MPDUs to be out of order.

Figure 2:
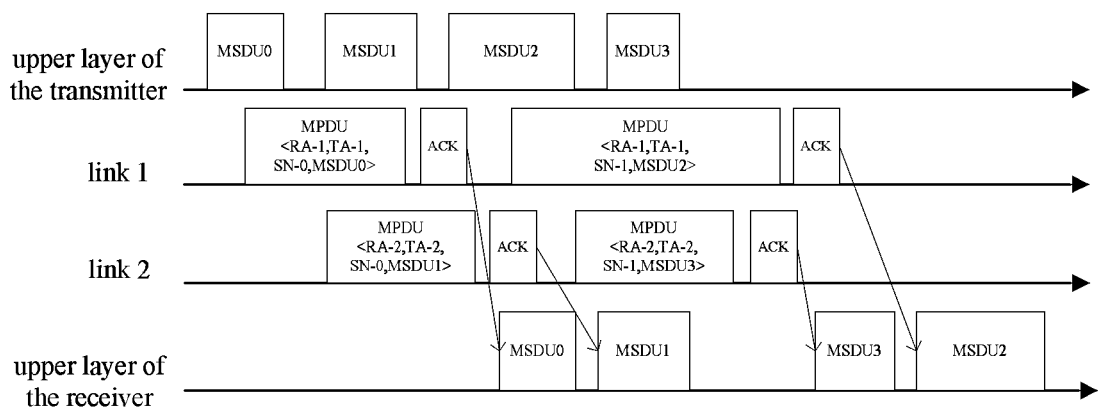
FIG. 2 is an operation scenario diagram of an MPDU transmission and reception method for a multi-link system in the existing techniques.

Referring to FIG. 2, FIG. 2 is an operation scenario diagram of an MPDU transmission and reception method for a multi-link system in the existing techniques.

As shown in FIG. 2, there are two links between a transmitter and a receiver, link 1 and link 2. On the link 1, the transmitter uses a MAC address TA-1, and the receiver uses a MAC address RA-1. On the link 2, the transmitter uses a MAC address TA-2, and the receiver uses a MAC address RA-2.

An upper layer of the transmitter has four MSDUs (0-3) to be transmitted. After obtaining the four MSDUs in sequence, the transmitter makes them contained in four MPDUs respectively as frame payloads. As long as any one link is available, any one of the four MPDUs can be transmitted on that link.

For ease of presentation, in FIG. 2, MPDU <RA-1, TA-1, SN-0, MSDU0> is used to indicate an MPDU that is transmitted on the link 1, has an SN of 0, and includes an MSDU0.

Specifically, at the receiver, MPDU <RA-1, TA-1, SN-0, MSDU0> is received first, and then MPDU <RA-2, TA-2, SN-0, MSDU1>, MPDU <RA-2, TA-2, SN-1, MSDU3>, MPDU <RA-1, TA-1, SN-1, MSDU2> are received in sequence.

The inventors further found through research that in the existing techniques, due to SNs in MPDU <RA-2, TA-2, SN-1, MSDU3> and MPDU <RA-1, TA-1, SN-1, MSDU2> cannot reflect a correct order of the MPDUs at the transmitter, and the receiver passes each received MPDU to the upper layer. Therefore, a transmission order of the MPDUs by the receiver to the upper layer is MSDU0, MSDU1, MSDU3, and MSDU2, which results in a disorder.

In embodiments of the present disclosure, a frame sequence number space is determined which includes a plurality of frame sequence numbers and is defined based on a triplet <U-ID_t, U-ID_r, TID>, wherein U-ID_t represents a unique identifier of a transmitter, and U-ID_r represents a unique identifier of a receiver. A transmission order of a plurality of MPDUs to be transmitted is determined, frame sequence numbers are sequentially obtained from the frame sequence number space based on the transmission order, and the plurality of MPDUs are transmitted based on the transmission order. Each of the plurality of MPDUs includes a transmitter address, a receiver address, an MSDU, the corresponding frame sequence number and a TID, so that the receiver determines the transmitter based on the transmitter address, and sorts one or more MPDUs which come from the same transmitter and have the same TID based on the frame sequence number. With the embodiments of the present disclosure, the frame sequence number space is generated based on the unique identifiers of the transmitter and the receiver, and the frame sequence numbers are sequentially obtained from the frame sequence number space during transmission, which may reduce possibility of overlap. Besides, the transmitted MPDUs include the frame sequence numbers, which helps to avoid disordered reception issues at the receiver in multi-link transmission.

In order to clarify the object, characteristic and advantages of embodiments of the present disclosure, embodiments of present disclosure will be described clearly in detail in conjunction with accompanying drawings.

Figure 3:
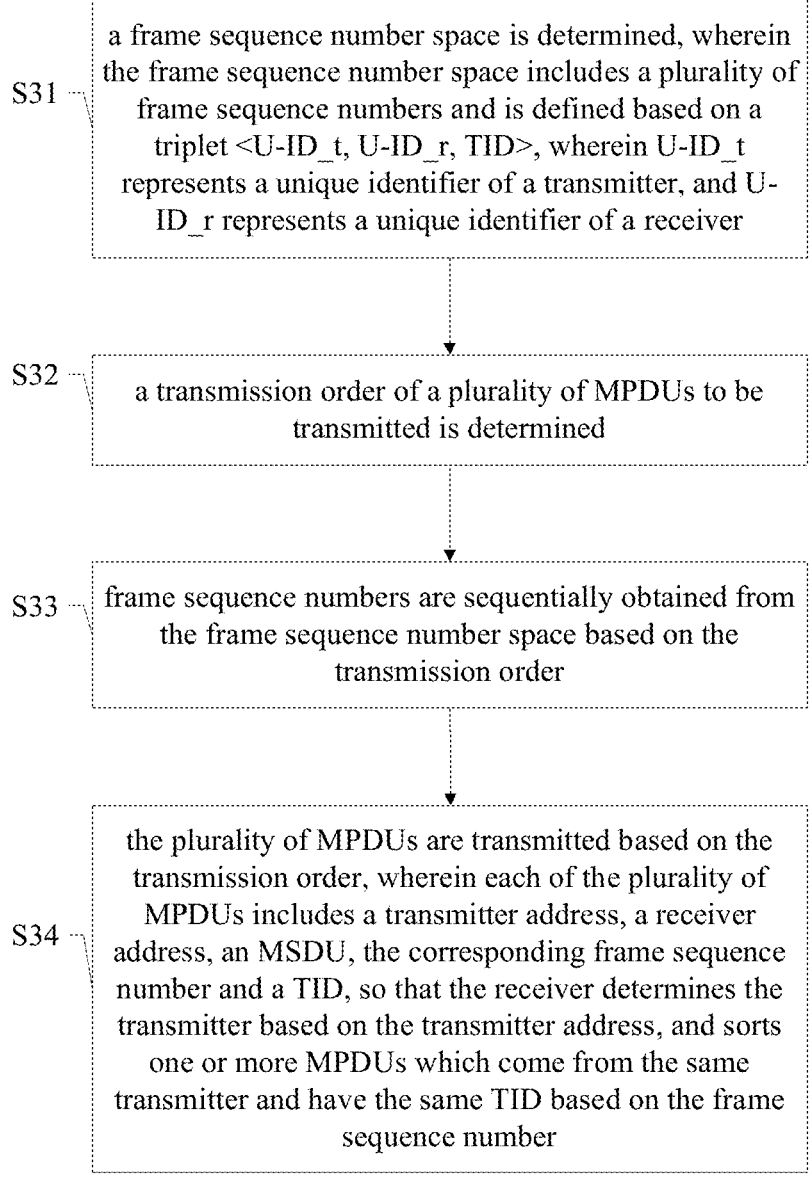
FIG. 3 is a flow chart of an MPDU transmission method for a multi-link system according to an embodiment.

Referring to FIG. 3, FIG. 3 is a flow chart of an MPDU transmission method for a multi-link system according to an embodiment. The MPDU transmission method may be applied in a transmitter, and may include S31, S32, S33 and S34.

In S31, a frame sequence number space is determined, wherein the frame sequence number space includes a plurality of frame sequence numbers and is defined based on a triplet <U-ID_t, U-ID_r, TID>, wherein U-ID_t represents a unique identifier of a transmitter, and U-ID_r represents a unique identifier of a receiver.

In S32, a transmission order of a plurality of MPDUs to be transmitted is determined.

In S33, frame sequence numbers are sequentially obtained from the frame sequence number space based on the transmission order.

In S34, the plurality of MPDUs are transmitted based on the transmission order, wherein each of the plurality of MPDUs includes a transmitter address, a receiver address, an MSDU, the corresponding frame sequence number and a TID, so that the receiver determines the transmitter based on the transmitter address, and sorts one or more MPDUs which come from the same transmitter and have the same TID based on the frame sequence number.

In some embodiments, in S31, a Unique Identification (U-ID) is defined for the transmitter and receiver supporting the multi-link system. The transmitter can be uniquely represented by its U-ID_t, and the receiver can be uniquely represented by its U-ID_r.

In some embodiments, before the frame sequence number space is determined, the method further includes: when a connection is set up on any link, transmitting U-ID_t to the receiver, and receiving U-ID_r from the receiver. At the transmitter, MPDUs with the same TID and transmitted to the same receiver are assigned with frame sequence numbers SN from the same frame sequence number space, and each triplet <U-ID_t, U-ID_r, TID> corresponds to one frame sequence number space.

In some embodiments, when the transmitter and the receiver set up a connection on any link, they will communicate the U-ID with each other, thereby effectively avoiding false identification each other in subsequent information exchange.

Further, in some embodiments, when receiving the MPDU from the transmitter, the receiver obtains the corresponding U-ID_t of the transmitter through TA of the MPDU.

In some embodiments, in S32, each MPDU carries an MSDU.

Specifically, the MSDU may belong to an upper layer protocol of a MAC layer, that is, a MAC service data unit, and the MPDU may belong to a lower layer protocol of the MAC layer, that is, a MAC protocol data unit. An MSDU is first received from an upper layer to a lower layer of the transmitter, and then encapsulated as an MPDU to be transmitted to a lower layer of the receiver, and then decapsulated into the MSDU by the receiver and reported to an upper layer of the receiver.

In some embodiments, the transmission order of the plurality of MPDUs to be transmitted may be determined based on the frame sequence numbers included in the MPDUs, where the frame sequence numbers are gradually increased by n (n is a positive integer), or based on a preset rule.

Further, the MPDUs may be non-aggregated MPDUs.

In some embodiments, setting a transmission window and a reception window in a non-aggregated MPDU scenario provides improvement for solutions under the multi-link scenario.

In some embodiments, in S33, the frame sequence numbers are sequentially obtained from the frame sequence number space based on the transmission order.

It should be pointed out that, as the frame sequence number space is defined based on the triplet <U-ID_t, U-ID_r, TID>, the frame sequence numbers may not be affected by other parameters in the multi-link, which reduces possibility of overlap.

In some embodiments, in S34, the plurality of MPDUs are transmitted based on the transmission order.

Each MPDU includes a transmitter address, a receiver address, an MSDU, the corresponding frame sequence number, and a TID, so that the receiver determines the transmitter according to the transmitter address, and sorts one or more MPDUs which come from the same transmitter and have the same TID based on the frame sequence number.

It should be noted that the receiver may decapsulate the sorted MPDUs to obtain MSDUs and report the MSDUs to the upper layer of the receiver. As the sorted MPDUs have a correct order, the MSDUs have a correct order accordingly. In some embodiments, there is no limitation on a specific implementation manner of the decapsulating and the reporting.

Figure 4:
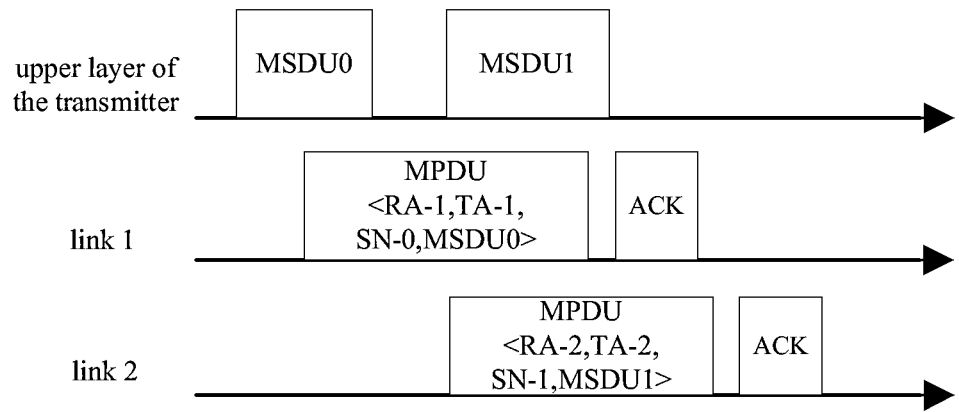
FIG. 4 is an operation scenario diagram of an MPDU transmission and reception method for a multi-link system according to an embodiment.

Referring to FIG. 4, FIG. 4 is an operation scenario diagram of an MPDU transmission and reception method for a multi-link system according to an embodiment.

As shown in FIG. 4, there are two links between a transmitter and a receiver, link 1 and link 2. On the link 1, the transmitter uses a MAC address TA-1, and the receiver uses a MAC address RA-1. On the link 2, the transmitter uses a MAC address TA-2, and the receiver uses a MAC address RA-2.

Specifically, an upper layer of the transmitter has two MSDUs (0-1) to be transmitted. After obtaining the two MSDUs in sequence, the transmitter makes them contained in 2 MPDUs as frame payloads. As RA/TA of the two MPDUs correspond to the same U-ID_r, the same U-ID_t, and the same TID, SNs are allocated for the two MPDUs from the same frame sequence number space during SN allocation.

Therefore, although the two MPDUs are transmitted on different links, their SNs can reflect a correct order of the MPDUs. That is, MSDU0 contained in the MPDU with SN=0 must be ahead of MSDU1 contained in the MPDU with SN=1.

In the embodiments of the present disclosure, the frame sequence number space is generated based on the unique identifiers of the transmitter and the receiver, and the frame sequence numbers are sequentially obtained from the frame sequence number space during transmission, which may reduce possibility of overlap. Besides, the transmitted MPDUs include the frame sequence numbers, which helps to avoid disordered reception issues at the receiver in multi-link transmission.

Still referring to FIG. 3, transmitting the plurality of MPDUs based on the transmission order includes: determining an initial transmission window which includes a first preset number of MPDUs arranged in the transmission order, wherein a first MPDU in the initial transmission window is an initial transmission MPDU.

In some embodiments, two parameters [WinStart_t, WinSize] may be used to indicate the initial transmission window and a transmission window subsequently updated. It could be understood that each triplet <U-ID_t, U-ID_r, TID> corresponds to one transmission window.

WinStart_t indicates a first MPDU in the transmission window (including the initial transmission window and the transmission window updated), which may be represented by the frame sequence number in the frame sequence number space, and WinSize indicates the first preset number, i.e., the number of MPDUs included in the transmission window.

The first preset number may be predefined, for example, determined based on a communication protocol.

In some embodiments, the frame sequence numbers in the frame sequence number space may gradually increase by one, and accordingly a size range of the transmission window may be [WinStart_t, WinStart_t+WinSize-1]. For example, if the initial frame sequence number is 0, and the first preset number is 2, the initial transmission window may be [0, 2]. In this way, complexity of indicating the transmission window is reduced.

In some embodiments, other rules for the transmission window may be defined. For the transmission window corresponding to a certain <U-ID_t, U-ID_r, TID>, the rule may include followings. The transmitter is allowed to transmit an MPDU on any link, if an SN of the MPDU is within a range of the corresponding transmission window, and the transmitter cannot transmit an MPDU with an SN greater than a greatest SN of the MPDUs in the current transmission window. Besides, only when the transmitter has transmitted all the MPDUs with the SNs within the current transmission window, and any of the MPDUs is either successfully transmitted or a life time is expired, the transmitter may update the transmission window. Under this condition, the transmitter updates WinStart_t to WinStart_t+WinSize. Besides, the transmitter cannot transmit an MPDU with an SN smaller than a smallest SN of the MPDUs in the current transmission window.

In some embodiments, in S34, transmitting the plurality of MPDUs based on the transmission order further includes: sequentially transmitting MPDUs in the initial transmission window until it is determined that transmission of all the MPDUs in the initial transmission window has completed, wherein the initial transmission MPDU is the first one to be transmitted; when transmission of all the MPDUs in the initial transmission window has completed, triggering update of the initial transmission window, wherein a difference between a sequence number of a first MPDU in the updated transmission window and a sequence number of the initial transmission MPDU is the first preset number; sequentially transmitting MPDUs in the updated transmission window until it is determined that transmission of all the MPDUs in the updated transmission window has completed, wherein the first MPDU in the updated transmission window is the first one to be transmitted; and continuing to update the updated transmission window again, and sequentially transmitting MPDUs in the latest updated transmission window, until it is determined that transmission of the plurality of MPDUs has completed.

In the embodiments of the present disclosure, by setting the initial transmission window and triggering the update of the initial transmission window when the MPDUs in the initial transmission window are all transmitted, groups of MPDUs can be transmitted sequentially, so that a transmission order and a reception order of MPDUs are more in line with a real order of the MPDUs, which further helps to avoid disordered reception issues at the receiver in multi-link transmission.

Further, in some embodiments, sequentially transmitting MPDUs in the initial transmission window until it is determined that transmission of the MPDUs in the initial transmission window has completed includes: on each link, once an MPDU is transmitted, if acknowledge information of the MPDU is received from the receiver within a first preset time period, transmitting a next MPDU in the initial transmission window; once an MPDU is transmitted, if acknowledge information of the MPDU is not received from the receiver within the first preset time period, retransmitting the MPDU; if acknowledge information of the retransmitted MPDU is received from the receiver within the first preset time period, transmitting the next MPDU in the initial transmission window; if acknowledge information of the retransmitted MPDU is not received from the receiver within the first preset time period, retransmitting the MPDU until a preset number of retransmissions have been done; and for all the MPDUs in the initial transmission window, if acknowledge information is received from the receiver or the preset number of retransmissions have been done, determining that transmission of all the MPDUs in the initial transmission window has completed.

Further, in some embodiments, sequentially transmitting MPDUs in the initial transmission window until it is determined that transmission of the MPDUs in the initial transmission window has completed further includes: before transmitting each MPDU, detecting a life time of the MPDU; and when the life time of the MPDU ends, abandoning transmitting the MPDU.

It should be noted that the step of detecting the life time of the MPDU to be transmitted before transmission may be applied to each transmission in the embodiments of the present disclosure.

In some embodiments, even if the MPDU has never been transmitted, but the life time of the MPDU ends, the MPDU is also deemed to have completed transmission.

Figure 5:
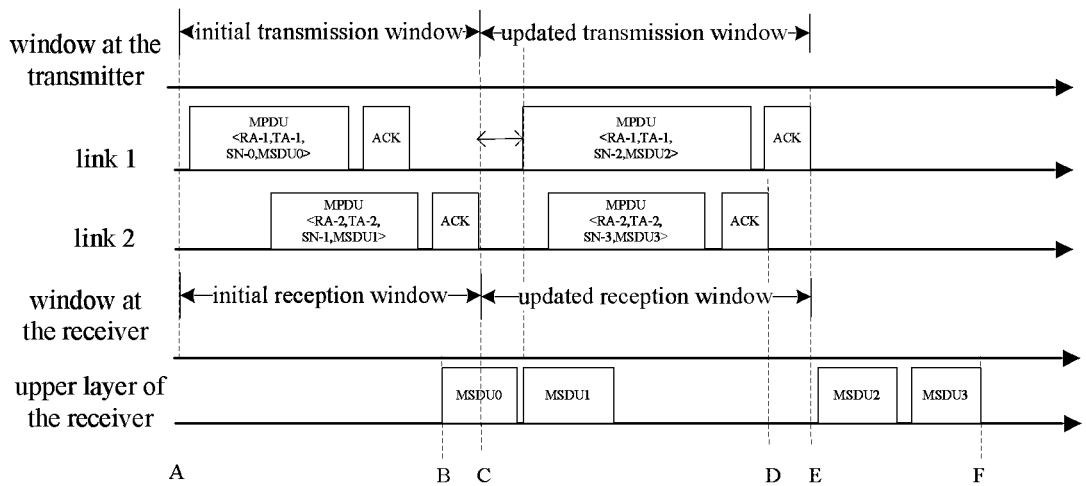
FIG. 5 is an operation scenario diagram of an MPDU transmission and reception method for a multi-link system according to an embodiment.

Referring to FIG. 5, FIG. 5 is an operation scenario diagram of an MPDU transmission and reception method for a multi-link system according to an embodiment.

As shown in FIG. 5, there are two links between a transmitter and a receiver, link 1 and link 2. On the link 1, the transmitter uses a MAC address TA-1, and the receiver uses a MAC address RA-1. On the link 2, the transmitter uses a MAC address TA-2, and the receiver uses a MAC address RA-2. WinSize agreed by the transmitter and the receiver is 2.

An upper layer of the transmitter has four MSDUs (0-3) to be transmitted. After obtaining the four MSDUs in sequence, the transmitter makes them contained in four MPDUs respectively as frame payloads. As long as any one link is available, any one of the four MPDUs can be transmitted on that link.

For ease of presentation, MPDU <RA-1, TA-1, SN-0, MSDU0> is used to indicate an MPDU that is transmitted on the link 1, has an SN of 0, and includes an MSDU0. As U-ID_t, U-ID_r, and TID of the MPDUs corresponding to these four MSDUs are the same, SNs of the four MPDUs are obtained from the same frame sequence number space, and reflect a correct order of the MPDUs/MSDUs.

An initial transmission window is provided between points A and C as shown in FIG. 5.

Specifically, the initial transmission window may be initialized as (WinStart_r=0, WinSize=2). According to a transmission window rule, only MPDUs with SN=0 or 1 are allowed to be transmitted on any available link at this time.

1. The transmitter first transmits MPDU <RA-1, TA-1, SN-0, MSDU0> on the link 1, and while transmitting this MPDU, further transmits MPDU <RA-2, TA-2, SN-1, MSDU1> on the link 2.

2. Although the transmission on the link 1 has been completed, as the transmission of MPDU with SN=1 on the link 2 has not been completed, transmission of a next MPDU on the link 1 will not start immediately after the transmission of MPDU with SN=0 is completed.

Further, after successfully transmitting the MPDU with SN=1 on the link 2, the transmitter updates the initial transmission window based on an update rule of the transmission window.

The updated transmission window is provided between points C and E as shown in FIG. 5.

It should be noted that, after point E, a newly updated transmission window may be further provided.

The update rule of the transmission window may further include: a difference between a sequence number of a first MPDU in the updated transmission window and a sequence number of an initial transmission MPDU being a first preset number.

Specifically, the transmission window is updated to (WinStart_t=2, WinSize=2), and at this time, MPDUs with SN=2 or 3 are allowed to be transmitted.

1. The transmitter first transmits MPDU <RA-1, TA-1, SN-2, MSDU2> on the link 1, and while transmitting this MPDU, further transmits MPDU <RA-2, TA-2, SN-3, MSDU3> on the link 2;

2. Although the transmission on the link 2 is completed, as the transmission of MPDU with SN=2 on the link 1 has not been completed, transmission of a next MPDU on the link 2 will not start immediately after the transmission of MPDU with SN=3 is completed.

In the embodiments of the present disclosure, the frame sequence number space is generated based on the unique identifiers of the transmitter and the receiver, and the frame sequence numbers are sequentially obtained from the frame sequence number space during transmission, which may reduce possibility of overlap. Besides, the transmitted MPDUs include the frame sequence numbers, which helps to avoid disordered reception issues at the receiver in multi-link transmission.

Figure 6:
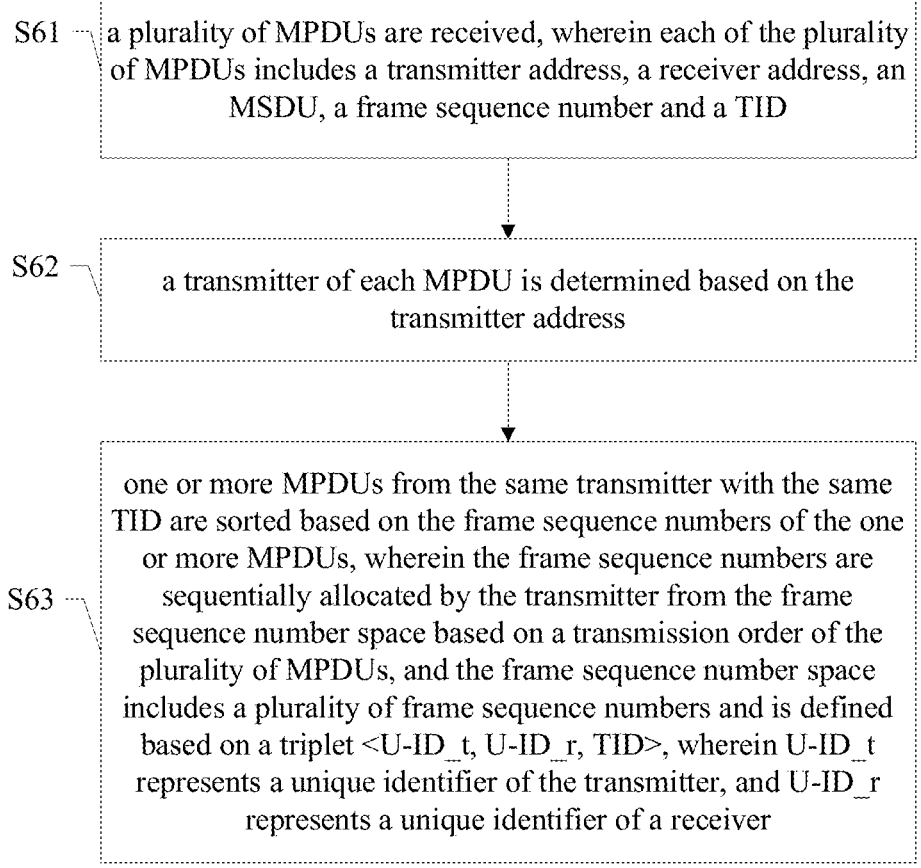
FIG. 6 is a flow chart of an MPDU reception method for a multi-link system according to an embodiment.

Referring to FIG. 6, FIG. 6 is a flow chart of an MPDU reception method for a multi-link system according to an embodiment. The MPDU reception method may be applied in a receiver, and may include S61, S62 and S63.

In S61, a plurality of MPDUs are received, wherein each of the plurality of MPDUs includes a transmitter address, a receiver address, an MSDU, a frame sequence number and a TID.

In S62, a transmitter of each MPDU is determined based on the transmitter address.

In S63, one or more MPDUs from the same transmitter with the same TID are sorted based on the frame sequence numbers of the one or more MPDUs, wherein the frame sequence numbers are sequentially allocated by the transmitter from the frame sequence number space based on a transmission order of the plurality of MPDUs, and the frame sequence number space includes a plurality of frame sequence numbers and is defined based on a triplet <U-ID_t, U-ID_r, TID>, wherein U-ID_t represents a unique identifier of the transmitter, and U-ID_r represents a unique identifier of a receiver.

In some embodiments, in S61, the receiver receives the plurality of MPDUs. Frame sequence numbers in the MPDUs are sequentially allocated by the transmitter from the frame sequence number space based on a transmission order, and the plurality of MPDUs are transmitted from the transmitter to the receiver based on the transmission order.

More details of the frame sequence number space and the transmitter address, the receiver address, the MSDU, the frame sequence number and the TID included in the MPDU can be found in the above descriptions of the MPDU transmission method for the multi-link system as shown in FIG. 3.

In S62, the receiver may determine the transmitter of each MPDU based on the transmitter address.

In some embodiments, when receiving the MPDU from the transmitter, the receiver obtains U-ID_t of the transmitter through the transmitter address of the MPDU, thus, the transmitter is uniquely determined.

In S63, the receiver may sort one or more MPDUs from the same transmitter with the same TID based on the frame sequence numbers of the one or more MPDUs.

In the embodiments of the present disclosure, the frame sequence number space is generated based on the unique identifiers of the transmitter and the receiver, and the frame sequence numbers are sequentially obtained from the frame sequence number space during transmission, which may reduce possibility of overlap. Besides, the transmitted MPDUs include the frame sequence numbers, so that the receiver can sort the received MPDUs based on their frame sequence numbers, which helps to avoid disordered reception issues at the receiver in multi-link transmission.

Further, in some embodiments, sorting one or more MPDUs from the same transmitter with the same TID based on the frame sequence numbers of the one or more MPDUs includes: determining an initial reception window, where the initial reception window includes a second preset number of MPDUs arranged in the transmission order, and a first MPDU in the initial reception window is an initial reception MPDU; and comparing a sequence number of the received MPDU with sequence numbers of the MPDUs already in the initial reception window, and determining whether to report the received MPDU based on the comparison result.

In some embodiments, two parameters [WinStart_r, WinSize] may be used to indicate the initial reception window and a reception window subsequently updated. It could be understood that each triplet <U-ID_t, U-ID_r, TID> corresponds to one reception window.

WinStart_r indicates a first MPDU in the reception window (including the initial reception window and the reception window updated), which may be represented by the frame sequence number in the frame sequence number space, and WinSize indicates the second preset number, i.e., the number of MPDUs included in the reception window.

The second preset number may be predefined, for example, determined based on a communication protocol.

In some embodiments, the second preset number may be equal to the first preset number in the transmission window, to improve consistency between a transmission rule and a reception rule.

In some embodiments, the frame sequence numbers in the frame sequence number space may gradually increase by one, and accordingly a size range of the reception window may be [WinStart_t, WinStart_t+WinSize-1]. For example, if the initial frame sequence number is 0, and the second preset number is 2, the initial reception window may be [0, 2]. In this way, complexity of indicating the reception window is reduced.

In some embodiments, other rules for the reception window may be defined.

For the reception window corresponding to a certain <U-ID_t, U-ID_r, TID>, the rule may include: WinStart_r being initialized to 0, and a size range of the reception window being [WinStart_r, WinStart_r+WinSize-1].

The rule may further include followings. If the receiver receives on any link an MPDU with an SN smaller than a smallest SN of the MPDUs in the corresponding reception window, the MPDU is discarded. If the receiver receives on any link an MPDU with an SN within the range of the corresponding reception window, the receiver needs to perform following steps in sequence. First, if no MPDU with the same SN has been received by a buffer at the receiver, the receiver puts the received MPDU into the buffer, or else, the receiver discards the MPDU. Second, the receiver passes the MPDU in the buffer to an upper layer for processing according to following rules. The MPDU with SN= WinStart_r has been received in the buffer, and the receiver passes the MPDU to the upper layer, then checks whether a next MPDU with a sequentially increased SN has been received, if the next MPDU has been received, the receiver passes the next MPDU to the upper layer, and further check another next MPDU in sequence; otherwise, the receiver does not pass the corresponding MPDU to the upper layer. Third, WinStart_r is updated to one plus an SN of an MPDU latest passed to the upper layer in the above second step.

In some embodiments, in S63, comparing a sequence number of the received MPDU with sequence numbers of the MPDUs already in the initial reception window, and determining whether to report the received MPDU based on the comparison result includes: if the frame sequence number of the received MPDU is the frame sequence number of the initial reception MPDU, reporting the MPDU and triggering update of the initial reception window to obtain a first updated reception window, wherein a first MPDU in the first updated reception window is an MPDU next to the initial reception MPDU; detecting whether an MPDU next to the latest reported MPDU has been received; if the MPDU next to the latest reported MPDU has been received, reporting the MPDU next to the latest reported MPDU; and triggering update of the first updated reception window.

In the embodiments of the present disclosure, by setting the initial reception window, reporting the MPDU with the SN same as the initial reception MPDU, and triggering the update of the reception window, it is possible to report the MPDUs in a correct order even if the MPDUs are received out of order.

In some embodiments, the method further includes: if the frame sequence numbers of one or more received MPDUs are frame sequence numbers other than the frame sequence number of the initial reception MPDU in the initial reception window, storing the one or more received MPDUs into a buffer.

In the embodiments of the present disclosure, by storing the one or more received MPDUs into the buffer, repeated transmission and reception may be avoided when the received MPDUs do not meet requirements, which helps to save communication resources.

Further, in some embodiments, comparing a sequence number of the received MPDU with sequence numbers of the MPDUs already in the initial reception window, and determining whether to report the received MPDU based on the comparison result further includes: if the frame sequence numbers of one or more received MPDUs are smaller than a smallest frame sequence number of the MPDUs in the initial reception window, discarding the one or more received MPDUs.

In the embodiments of the present disclosure, by setting the initial reception window, and discarding the one or more received MPDUs if their frame sequence numbers are smaller than the smallest frame sequence number of the MPDUs in the initial reception window, an out of order issue may be avoided when the received MPDUs affect sequential reporting of the MPDUs.

In some embodiments, the rule of the reception window may further include a case that an SN of a received MPDU exceeds a range of the corresponding reception window. In this case, the receiver may perform following steps in sequence. First, if no MPDU with the same SN has been received by the buffer at the receiver, the receiver puts the received MPDU into the buffer. Second, if an MPDU with the same SN has been received by the buffer at the receiver, the receiver discards the MPDU, WinStart_r is updated to an SN of the received MPDU minus WinSize and plus 1. Third, all MPDUs in the buffer with SNs smaller than the updated WinStart_r are passed to the upper layer. Fourth, if an MPDU with SN=WinStart_r has been received in the buffer, the receiver passes this MPDU to the upper layer, checks whether a next MPDU with a sequentially increased SN has been received, if received, pass the next MPDU to the upper layer, and further checks another next MPDU in sequence. Fifth, if the next MPDU with the sequentially increased SN has not been received, the receiver does not perform the reporting, and updates WinStart_r to one plus an SN of the MPDU latest passed to the upper layer in the above fourth step.

In some embodiments, in S63, comparing a sequence number of the received MPDU with sequence numbers of the MPDUs already in the initial reception window, and determining whether to report the received MPDU based on the comparison result includes: if the frame sequence number of the received MPDU is greater than a greatest frame sequence number of the MPDUs in the initial reception window, storing the received MPDU into a buffer; updating the initial reception window to obtain a second updated reception window, wherein a frame sequence number of the received MPDU is a greatest frame sequence number of the MPDUs in the second updated reception window; among the received and unreported MPDUs, reporting the MPDUs whose frame sequence numbers are smaller than a smallest frame sequence number of the MPDUs in the second updated reception window; detecting whether a first MPDU in the second updated reception window has been received; if the first MPDU in the second updated reception window has been received, reporting the first MPDU, or else, suspending reporting; detecting whether an MPDU next to the latest reported MPDU has been received; and if the MPDU next to the latest reported MPDU has been received, reporting the MPDU next to the latest reported MPDU, or else, suspending reporting.

In the embodiments of the present disclosure, the reception window is updated immediately after each transmission of MPDU, and reporting is performed only when the first MPDU in the reception window is received, which may effectively increase possibility of reporting in sequence.

In some embodiments, the method further includes: when the reporting is suspended, triggering update of the second updated reception window, wherein a first MPDU in the updated second updated reception window is an MPDU next to the latest reported MPDU.

In the embodiments of the present disclosure, by setting the step of triggering the update of the reception window when the reporting is suspended, the update can be performed in time when no available MPDU can be reported, so as to avoid a long wait, which helps the receiver to report the received MPDUs as soon as possible while still maintaining a real order of these MPDUs.

In some embodiments, the rule of the reception window may further include defining a timer. A rule of the timer may include following aspects. Whenever WinStart_r is updated, the timer will restart; when the timer expires (timeout), the receiver may perform below steps in sequence. First, if an MPDU with SN=WinStart_r has been received in the buffer, the receiver passes this MPDU to the upper layer for processing. Second, the receiver checks whether a next MPDU with a sequentially increased SN has been received, if it is received, passes the next MPDU to the upper layer, and further checks another next MPDU in sequence. If the next MPDU with the sequentially increased SN has not been received, the receiver does not pass the next MPDU to the upper layer, and updates WinStart_r to one plus an SN of the MPDU latest passed to the upper layer in the above second step.

In some embodiments, in S63, comparing a sequence number of the received MPDU with sequence numbers of the MPDUs already in the initial reception window, and determining whether to report the received MPDU based on the comparison result includes: setting a timer starting from a time of reporting a previous MPDU, wherein a duration of the timer is a second preset time period; when the timer expires, if the frame sequence numbers of one or more received MPDUs are the frame sequence numbers other than the frame sequence number of the initial reception MPDU in the initial reception window, reporting an MPDU with a smallest frame sequence number in the one or more received MPDUs; detecting whether an MPDU next to the latest reported MPDU has been received; if the MPDU next to the latest reported MPDU has been received, reporting the MPDU next to the latest reported MPDU, or else, suspending reporting; when the reporting is suspended, triggering update of the initial reception window to obtain a third updated reception window, wherein a first MPDU in the third updated reception window is an MPDU next to the latest reported MPDU; and when the reporting is suspended, triggering the timer to restart.

In the embodiments of the present disclosure, by setting the timer, a case of waiting for some MPDUs for a long time may be avoided, which helps the receiver to report the received MPDUs as soon as possible while still maintaining a real order of these MPDUs.

In some embodiments, comparing a sequence number of the received MPDU with sequence numbers of the MPDUs already in the initial reception window, and determining whether to report the received MPDU based on the comparison result further includes: when the timer expires, if no MPDU has been received, triggering the timer to restart, wherein a duration of the timer is the second preset time period.

In the embodiments of the present disclosure, by enabling a restart function of the timer, the timer can work repeatedly, so as to avoid lack of effectiveness of the timer due to its expiration when no MPDU is received in a long time.

In the embodiments of the present disclosure, by setting the initial reception window and triggering the update of the initial reception window after reporting the MPDU, a case of waiting for some MPDUs for a long time when the received MPDUs are out of order may be avoided, which helps the receiver to report the received MPDUs as soon as possible while still maintaining a real order of these MPDUs.

Still referring to FIG. 5, the initial transmission window is provided between points A and C.

As shown in FIG. 5, there are two links between the transmitter and the receiver, link 1 and link 2. On the link 1, the transmitter uses a MAC address TA-1, and the receiver uses a MAC address RA-1. On the link 2, the transmitter uses a MAC address TA-2, and the receiver uses a MAC address RA-2. WinSize agreed by the transmitter and the receiver is 2.

An upper layer of the transmitter has four MSDUs (0-3) to be transmitted. After obtaining the four MSDUs in sequence, the transmitter makes them contained in four MPDUs respectively as frame payloads. As long as any one link is available, any one of the four MPDUs can be transmitted on that link.

For ease of presentation, MPDU <RA-1, TA-1, SN-0, MSDU0> is used to indicate an MPDU that is transmitted on the link 1, has an SN of 0, and includes an MSDU0. As U-ID_t, U-ID_r, and TID of the MPDUs corresponding to these four MSDUs are the same, SNs of the four MPDUs are obtained from the same frame sequence number space, and reflect a correct order of the MPDUs/MSDUs.

An initial reception window is provided between points A and C as shown in FIG. 5.

Specifically, the initial reception window may be initialized as (WinStart_r=0, WinSize=2). According to a transmission window rule, the receiver performs following steps.

1. The receiver first receives an MPDU with SN=0 on the link 1, and according to the reception window rule, reports the MPDU with SN=0 to an upper layer for processing, and updates WinStart_r=1.

2. The receiver further receives an MPDU with SN=1 on the link 2, and according to the reception window rule, transmits the MPDU with SN=1 to the upper layer for processing, and updates WinStart_r=2.

3. In this manner, the upper layer of the receiver receives MSDU0 and MSDU1 in a correct order, and the reception window at this time is (WinStart_r=2, WinSize=2).

Further, after the MPDU with SN=1 is successfully transmitted on the link 2, the initial reception window is updated according to an update rule of the reception window.

The updated reception window is provided between points C and E as shown in FIG. 5.

It should be noted that, after point E, a newly updated reception window may be further provided.

The update rule of the reception window may further include following aspects.

1. The receiver first receives an MPDU with SN=3 on the link 2, and according to the reception window rule, does not report the MPDU with SN=3 to the upper layer for processing.

2. The receiver further receives an MPDU with SN=2 on the link 1, and according to the reception window rule, transmits the MPDU with SN=2 and the MPDU with SN=3 to the upper layer for processing, and updates WinStart_r=4.

3. In this manner, the upper layer of the receiver receives MSDU2 and MSDU3 in a correct order, and the reception window at this time is (WinStart_r=4, WinSize=2).

Based on the above process, between points B and F as shown in FIG. 5, the upper layer of the receiver can receive MSDU0, MSDU1, MSDU2 and MSDU3 in a correct order.

In the embodiments of the present disclosure, the frame sequence number space is generated based on the unique identifiers of the transmitter and the receiver, and the frame sequence numbers are sequentially obtained from the frame sequence number space during transmission, which may reduce possibility of overlap. Besides, the transmitted MPDUs include the frame sequence numbers, so that the receiver can sort the received MPDUs based on their frame sequence numbers, which helps to avoid disordered reception issues at the receiver in multi-link transmission.

Figure 7:
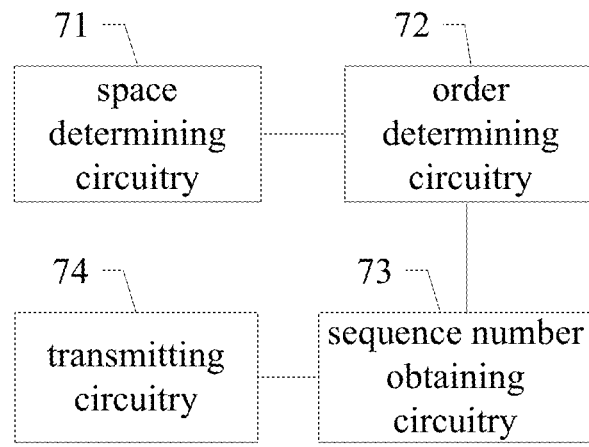
FIG. 7 is a structural diagram of an MPDU transmission device for a multi-link system according to an embodiment.

Referring to FIG. 7, FIG. 7 is a structural diagram of an MPDU transmission device for a multi-link system according to an embodiment. The MPDU transmission device may be applied in a transmitter.

The MPDU transmission device may include: a space determining circuitry 71 configured to determine a frame sequence number space which includes a plurality of frame sequence numbers and is defined based on a triplet <U-ID_t, U-ID_r, TID>, wherein U-ID_t represents a unique identifier of a transmitter, and U-ID_r represents a unique identifier of a receiver; an order determining circuitry 72 configured to determine a transmission order of a plurality of MPDUs to be transmitted; a sequence number obtaining circuitry 73 configured to sequentially obtain frame sequence numbers from the frame sequence number space based on the transmission order; and a transmitting circuitry 74 configured to transmit the plurality of MPDUs based on the transmission order, wherein each of the plurality of MPDUs includes a transmitter address, a receiver address, an MSDU, the corresponding frame sequence number and a TID, so that the receiver determines the transmitter based on the transmitter address, and sorts one or more MPDUs which come from the same transmitter and have the same TID based on the frame sequence number.

In the embodiments of the present disclosure, the frame sequence number space is generated based on the unique identifiers of the transmitter and the receiver, and the frame sequence numbers are sequentially obtained from the frame sequence number space during transmission, which may reduce possibility of overlap. Besides, the transmitted MPDUs include the frame sequence numbers, so that the receiver can sort the received MPDUs based on their frame sequence numbers, which helps to avoid disordered reception issues at the receiver in multi-link transmission.

More details of principles, implementations and advantages of the MPDU transmission device for the multi-link system can be found in the above descriptions of the MPDU transmission method for the multi-link system as shown in FIG. 3, and are not described here.

Figure 8:
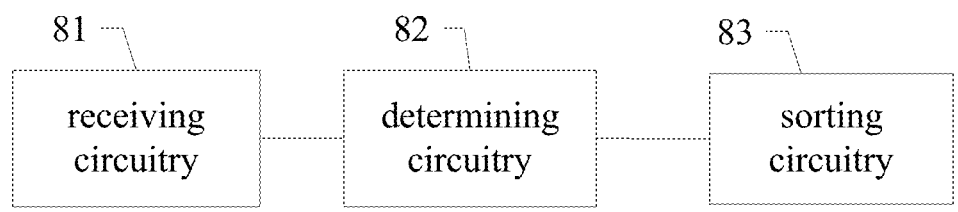
FIG. 8 is a structural diagram of an MPDU reception device for a multi-link system according to an embodiment.

Referring to FIG. 8, FIG. 8 is a structural diagram of an MPDU reception device for a multi-link system according to an embodiment. The MPDU reception device may be applied in a receiver.

The MPDU reception device may include: a receiving circuitry 81 configured to receive a plurality of MPDUs, wherein each of the plurality of MPDUs includes a transmitter address, a receiver address, an MSDU, a frame sequence number and a TID; a determining circuitry 82 configured to determine a transmitter of each MPDU based on the transmitter address; and a sorting circuitry 83 configured to sort one or more MPDUs from the same transmitter with the same TID based on the frame sequence numbers of the one or more MPDUs, wherein the frame sequence numbers are sequentially allocated by the transmitter from the frame sequence number space based on a transmission order of the plurality of MPDUs, and the frame sequence number space includes a plurality of frame sequence numbers and is defined based on a triplet <U-ID_t, U-ID_r, TID>, wherein U-ID_t represents a unique identifier of the transmitter, and U-ID_r represents a unique identifier of a receiver.

In the embodiments of the present disclosure, the frame sequence number space is generated based on the unique identifiers of the transmitter and the receiver, and the frame sequence numbers are sequentially obtained from the frame sequence number space during transmission, which may reduce possibility of overlap. Besides, the transmitted MPDUs include the frame sequence numbers, which helps to avoid disordered reception issues at the receiver in multi-link transmission.

More details of principles, implementations and advantages of the MPDU reception device for the multi-link system can be found in the above descriptions of the MPDU reception method for the multi-link system as shown in FIG. 6, and are not described here.

In an embodiment of the present disclosure, a storage medium having computer instructions stored therein is provided, wherein when the computer instructions are executed, the above method as shown in FIG. 3 or FIG. 6 is performed. The storage medium may be a computer readable storage medium, such as a non-volatile or non-transitory memory, or an optical disk, a Solid State Drive (SSD) or a Hard Disk Drive (HDD).

In some embodiments, the processor may include a Central Processing Unit (CPU), a general-purpose processor, a Digital Signal Processor (DSP), or an Application Specific Integrated Circuit (ASIC), a Field Programmable Gate Array (FPGA) or other programmable logic devices, a discrete gate or a transistor logic device, or discrete hardware components. The general-purpose processor may be a microprocessor or any conventional processor.

It should also be understood that the memory in the embodiments of the present disclosure may be a volatile memory or non-volatile memory, or may include both volatile and non-volatile memories. The non-volatile memory may be a Read Only Memory (ROM), a Programmable Read Only Memory (PROM), an Erasable Programmable Read Only Memory (EPROM), an Electrically Erasable Programmable Read Only Memory (EEPROM) or a flash memory. The volatile memory may be a Random Access Memory (RAM) used as an external cache. For example, many types of RAM are available, such as a Static RAM (SRAM), a Dynamic RAM (DRAM), and a Synchronous DRAM (SDRAM), a Double Data Rate SDRAM (DDR SDRAM), an Enhanced SDRAM (ESDRAM), a Synchlink DRAM (SLDRAM) or a Direct Rambus RAM (DR RAM).

In an embodiment of the present disclosure, a transmitter including a memory and a processor is provided, wherein the memory has computer instructions stored therein, and when the processor executes the computer instructions, the above method as shown in FIG. 3 is performed.

In an embodiment of the present disclosure, a receiver including a memory and a processor is provided, wherein the memory has computer instructions stored therein, and when the processor executes the computer instructions, the above method as shown in FIG. 6 is performed.

In some embodiments, the transmitter and the receiver may be a base station or a terminal.

In some embodiments, the base station (BS) may also be called a base station equipment deployed in a Radio Access Network (RAN) to provide a radio communication function. For example, an equipment that serves as a base station in a 2G network includes a Base Transceiver Station (BTS), an equipment that serves as a base station in a 3G network includes NodeB, an equipment that serves as a base station in a 4G network includes evolved NodeB (eNB), an equipment that serves as a base station in a WLAN is an Access Point (AP), and an equipment that serves as a base station in 5G New Radio (NR) includes gNB and next generation evolved NodeB (ng-eNB). NR technology is used for communication between gNB and a terminal, and Evolved Universal Terrestrial Radio Access (E-UTRA) technology is used for communication between ng-eNB and a terminal. Both gNB and ng-eNB can be connected to a 5G core network. The base station in the embodiments of the present disclosure further includes an equipment that serves as a base station in a new communication system in the future.

In some embodiments, the terminal in the embodiments of the present application may refer to a User Equipment (UE), an access terminal, a user unit, a user station, a Mobile Station (MS), a remote station, a remote terminal, a mobile equipment, a user terminal, a terminal equipment, a wireless communication equipment, a user agent or a user device. The terminal equipment may be a cellular phone, a cordless phone, a Session Initiation Protocol (SIP) phone, a Wireless Local Loop (WLL) station, a Personal Digital Assistant (PDA), or a handheld device, a computing device, processing devices connected to a wireless modem, an in-vehicle device, or a wearable device with a wireless communication function, a terminal device in a future 5G network, or a terminal device in a future evolved Public Land Mobile Network (PLMN). Embodiments of the present disclosure are not limited thereto.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A MAC Protocol Data Unit (MPDU) transmission method for a multi-link system, comprising:
   determining a frame sequence number space which comprises a plurality of frame sequence numbers and is defined based on a triplet <U-ID_t, U-ID_r, TID>, wherein U-ID_t represents a unique identifier of a transmitter, and U-ID_r represents a unique identifier of a receiver;
   determining a transmission order of a plurality of MPDUs to be transmitted;
   sequentially obtaining frame sequence numbers from the frame sequence number space based on the transmission order; and
   transmitting the plurality of MPDUs based on the transmission order, wherein each of the plurality of MPDUs comprises a transmitter address, a receiver address, a MAC Service Data Unit (MSDU), the corresponding frame sequence number and a Traffic Identifier (TID), so that the receiver determines the transmitter based on the transmitter address, and sorts one or more MPDUs which come from the same transmitter and have the same TID based on the frame sequence number, wherein transmitting the plurality of MPDUs based on the transmission order comprises:
determining an initial transmission window which comprises a first preset number of MPDUs arranged in the transmission order, wherein a first MPDU in the initial transmission window is an initial transmission MPDU;
sequentially transmitting MPDUs in the initial transmission window until it is determined that transmission of all the MPDUs in the initial transmission window has completed, wherein the initial transmission MPDU is the first one to be transmitted;
based on transmission all the MPDUs in the initial transmission window having completed, triggering update of the initial transmission window, where a difference between a sequence number of a first MPDU in the updated transmission window and a sequence number of the initial transmission MPDU is the first preset number;
sequentially transmitting MPDUs in the updated transmission window until it is determined that transmission of all the MPDUs in the updated transmission window has completed, wherein the first MPDU in the updated transmission window is the first one to be transmitted; and
continuing to update the updated transmission window again, and sequentially transmitting MPDUs in the latest updated transmission window, until it is determined that transmission of the plurality of MPDUs has completed,
wherein sequentially transmitting MPDUs in the initial transmission window until it is determined that transmission of the MPDUs in the initial transmission window has completed comprises:
on each link, once an MPDU is transmitted, in response to acknowledge information of the MPDU being received from the receiver within a first preset time period, transmitting a next MPDU in the initial transmission window;
once an MPDU is transmitted, in response to acknowledge information of the MPDU being once an MPDU is transmitted, in response to acknowledge information of the MPDU being not received from the receiver within the first preset time period, retransmitting the MPDU;
in response to acknowledge information of the retransmitted MPDU being received from the receiver within the first preset time period, transmitting the next MPDU in the initial transmission window;
in response to acknowledge information of the retransmitted MPDU being not received from the receiver within the first preset time period, retransmitting the MPDU until a preset number of retransmissions have been done; and
for all the MPDUs in the initial transmission window, in response to acknowledge information being received from the receiver or the preset number of retransmissions have been done, determining that transmission of all the MPDUs in the initial transmission window has completed.

2. The method according to claim 1, wherein sequentially transmitting MPDUs in the initial transmission window until it is determined that transmission of the MPDUs in the initial transmission window has completed further comprises:
before transmitting each MPDU, detecting a life time of the MPDU; and
based on the life time of the MPDU ending, abandoning transmitting the MPDU.

3. The method according to claim 1, wherein the first preset number is predefined.

4. The method according to claim 1, wherein the MPDUs are non-aggregated MPDUs.

5. The method according to claim 1, wherein before the frame sequence number space is determined, the method further comprises:
in response to a connection being set up on any link, transmitting U-ID_t to the receiver, and receiving U-ID_r from the receiver.

6. A MAC Protocol Data Unit (MPDU) reception method for a multi-link system, comprising:
receiving a plurality of MPDUs at different times, wherein each of the plurality of MPDUs comprises a transmitter address, a receiver address, a MAC Service Data Unit (MSDU), a frame sequence number and a Traffic Identifier (TID);
determining a transmitter of each MPDU based on the transmitter address; and
sorting one or more MPDUs from the same transmitter with the same TID based on the frame sequence numbers of the one or more MPDUs,
wherein the frame sequence numbers are sequentially allocated by the transmitter from the frame sequence number space based on a transmission order of the plurality of MPDUs, and the frame sequence number space comprises a plurality of frame sequence numbers and is defined based on a triplet <U-ID_t, U-ID_r, TID>, wherein U-ID_t represents a unique identifier of the transmitter, and U-ID_r represents a unique identifier of a receiver,
wherein sorting one or more MPDUs from the same transmitter with the same TID based on the frame sequence numbers of the one or more MPDUs comprises:
determining an initial reception window, where the initial reception window comprises a second preset number of MPDUs arranged in the transmission order, and a first MPDU in the initial reception window is an initial reception MPDU;
comparing a sequence number of the MPDU currently received at one of the different times with sequence numbers of the MPDUs included in the initial reception window, and determining whether to report the currently received MPDU to an upper layer of the receiver based on the comparison result.

7. The method according to claim 6, wherein comparing a sequence number of the MPDU currently received at one of the different times with sequence numbers of the MPDUs included in the initial reception window, and determining whether to report the MPDU currently received based on the comparison result comprises:
in response to the frame sequence number of the MPDU currently received being the frame sequence number of the initial reception MPDU, reporting the MPDU currently received and triggering update of the initial reception window to obtain a first updated reception window, wherein a first MPDU in the first updated reception window is an MPDU next to the initial reception MPDU;
detecting whether an MPDU next to the latest reported MPDU has been received; and
in response to the MPDU next to the latest reported MPDU having been received, reporting the MPDU next to the latest reported MPDU, and triggering update of the first updated reception window.

8. The method according to claim 7, further comprising:
in response to the frame sequence number of the MPDU currently received being different from the frame sequence number of the initial reception MPDU in the initial reception window, storing the MPDU currently received into a buffer.

9. The method according to claim 6, wherein comparing a sequence number of the MPDU currently received at one of the different times with sequence numbers of the MPDUs included in the initial reception window, and determining whether to report the MPDU currently received based on the comparison result comprises:
in response to the frame sequence number of the MPDU currently received being smaller than a smallest frame sequence number of the MPDUs in the initial reception window, discarding the MPDU currently received.

10. The method according to claim 6, wherein comparing a sequence number of the MPDU currently received at one of the different times with sequence numbers of the MPDUs included in the initial reception window, and determining whether to report the MPDU currently received based on the comparison result comprises:
in response to the frame sequence number of the MPDU currently received being greater than a greatest frame sequence number of the MPDUs in the initial reception window, storing the MPDU currently received into a buffer, and updating the initial reception window to obtain a second updated reception window, wherein a frame sequence number of the MPDU currently received is a greatest frame sequence number of the MPDUs in the second updated reception window;
among the received and unreported MPDUs, reporting the MPDUs whose frame sequence numbers are smaller than a smallest frame sequence number of the MPDUs in the second updated reception window;
detecting whether a first MPDU in the second updated reception window has been received;
in response to the first MPDU in the second updated reception window having been received, reporting the first MPDU, in response to the first MPDU in the second updated reception window having not been received, suspending reporting;
detecting whether an MPDU next to the latest reported MPDU has been received; and
in response to the MPDU next to the latest reported MPDU having been received, reporting the MPDU next to the latest reported MPDU, in response to the MPDU next to the latest reported MPDU having not been received, suspending reporting.

11. The method according to claim 10, further comprising:
based on the reporting being suspended, triggering update of the second updated reception window, wherein a first MPDU in the updated second updated reception window is an MPDU next to the latest reported MPDU.

12. The method according to claim 6, wherein comparing a sequence number of the MPDU currently received at one of the different times with sequence numbers of the MPDUs included in the initial reception window, and determining whether to report the MPDU currently received based on the comparison result comprises:
setting a timer starting from a time of reporting a previous MPDU, wherein a duration of the timer is a second preset time period;
based on the timer expiring, in response to the frame sequence numbers of one or more MPDUs currently received being different from the frame sequence number of the initial reception MPDU in the initial reception window, reporting an MPDU with a smallest frame sequence number in the one or more MPDUs currently received;
detecting whether an MPDU next to the latest reported MPDU has been received;
in response to the MPDU next to the latest reported MPDU having been received, reporting the MPDU next to the latest reported MPDU, in response to the MPDU next to the latest reported MPDU having not been received, suspending reporting;
based on the reporting being suspended, triggering update of the initial reception window to obtain a third updated reception window, wherein a first MPDU in the third updated reception window is an MPDU next to the latest reported MPDU; and
based on the reporting being suspended, triggering the timer to restart.

13. The method according to claim 12, wherein comparing a sequence number of the MPDU currently received at one of the different times with sequence numbers of the MPDUs included in the initial reception window, and determining whether to report the MPDU currently received based on the comparison result further comprises:
based on the timer expiring, and no MPDU having been received, triggering the timer to restart, wherein a duration of the timer is the second preset time period.

14. A receiver comprising a memory and a processor, wherein the memory has computer instructions stored therein, and when the processor executes the computer instructions, the method according to claim 6 is performed.

15. A transmitter comprising a memory and a processor, wherein the memory stores one or more programs, the one or more programs comprising computer instructions, which, when executed by the processor, cause the processor to:
determine a frame sequence number space which comprises a plurality of frame sequence numbers and is defined based on a triplet <U-ID_t, U-ID_r, TID>, wherein U-ID_t represents a unique identifier of a transmitter, and U-ID_r represents a unique identifier of a receiver;
determine a transmission order of a plurality of MAC Protocol Data Units (MPDUs) to be transmitted;
sequentially obtain frame sequence numbers from the frame sequence number space based on the transmission order; and
transmit the plurality of MPDUs based on the transmission order, wherein each of the plurality of MPDUs comprises a transmitter address, a receiver address, a MAC Service Data Unit (MSDU), the corresponding frame sequence number and a Traffic Identifier (TID), so that the receiver determines the transmitter based on the transmitter address, and sorts one or more MPDUs which come from the same transmitter and have the same TID based on the frame sequence number,
wherein transmitting the plurality of MPDUs based on the transmission order comprises:
determining an initial transmission window which comprises a first preset number of MPDUs arranged in the transmission order, wherein a first MPDU in the initial transmission window is an initial transmission MPDU;
sequentially transmitting MPDUs in the initial transmission window until it is determined that transmission of all the MPDUs in the initial transmission window has completed, wherein the initial transmission MPDU is the first one to be transmitted;

based on transmission all the MPDUs in the initial transmission window having completed, triggering update of the initial transmission window, where a difference between a sequence number of a first MPDU in the updated transmission window and a sequence number of the initial transmission MPDU is the first preset number;

sequentially transmitting MPDUs in the updated transmission window until it is determined that transmission of all the MPDUs in the updated transmission window has completed, wherein the first MPDU in the updated transmission window is the first one to be transmitted, and continuing to update the updated transmission window again, and sequentially transmitting MPDUs in the latest updated transmission window, until it is determined that transmission of the plurality of MPDUs has completed, wherein sequentially transmitting MPDUs in the initial transmission window until it is determined that transmission of the MPDUs in the initial transmission window has completed comprises:

on each link, once an MPDU is transmitted, in response to acknowledge information of the MPDU being received from the receiver within a first preset time period, transmitting a next MPDU in the initial transmission window;

once an MPDU is transmitted, in response to acknowledge information of the MPDU being once an MPDU is transmitted, in response to acknowledge information of the MPDU being not received from the receiver within the first preset time period, retransmitting the MPDU;

in response to acknowledge information of the retransmitted MPDU being received from the receiver within the first preset time period, transmitting the next MPDU in the initial transmission window;

in response to acknowledge information of the retransmitted MPDU being not received from the receiver within the first preset time period, retransmitting the MPDU until a preset number of retransmissions have been done; and for all the MPDUs in the initial transmission window, in response to acknowledge information being received from the receiver or the preset number of retransmissions have been done, determining that transmission of all the MPDUs in the initial transmission window has completed.

* * * * *